US011418840B2

(12) United States Patent
Varis Doggett et al.

(10) Patent No.: US 11,418,840 B2
(45) Date of Patent: Aug. 16, 2022

(54) ASPECT RATIO ERROR RECOGNITION

(71) Applicant: Disney Enterprises, Inc., Burbank, CA (US)

(72) Inventors: Erika Elizabeth Varis Doggett, Los Angeles, CA (US); Anna M. C. Wolak, Seattle, WA (US); Leonid Sigal, Vancouver (CA)

(73) Assignee: Disney Enterprises, Inc., Burbank, CA (US)

( * ) Notice: Subject to any disclaimer, the term of this patent is extended or adjusted under 35 U.S.C. 154(b) by 10 days.

(21) Appl. No.: 16/416,379

(22) Filed: May 20, 2019

(65) Prior Publication Data
US 2020/0374585 A1    Nov. 26, 2020

(51) Int. Cl.
*H04N 21/4402* (2011.01)
*H04N 7/01* (2006.01)

(52) U.S. Cl.
CPC ... *H04N 21/440272* (2013.01); *H04N 7/0122* (2013.01); *H04N 21/440281* (2013.01)

(58) Field of Classification Search
CPC ... H04N 21/440272; H04N 21/440281; H04N 7/0122
USPC .......................................... 348/445; 382/260
See application file for complete search history.

(56) References Cited

U.S. PATENT DOCUMENTS

| | | | | |
|---|---|---|---|---|
| 5,521,658 A * | 5/1996 | Donohoe | ............. | H04N 5/7441 353/69 |
| 6,493,467 B1 * | 12/2002 | Okuda | .................... | G06T 5/009 382/304 |
| 8,731,285 B1 * | 5/2014 | Hundemer | ........... | H04N 21/435 382/165 |
| 2009/0016692 A1 | 1/2009 | Lin et al. | | |
| 2009/0238408 A1 * | 9/2009 | Ikeda | ........................ | G06T 7/11 382/103 |
| 2012/0058671 A1 * | 3/2012 | Kang | ................. | H01R 13/6658 439/527 |
| 2013/0155320 A1 * | 6/2013 | Siddaramanna | ..... | H04N 7/0122 348/445 |
| 2015/0155009 A1 * | 6/2015 | Mate | ................ | H04N 21/23424 386/278 |

(Continued)

OTHER PUBLICATIONS

Extended European Search Report for Application No. 20175264.9-1210 dated Sep. 25, 2020.

*Primary Examiner* — John W Miller
*Assistant Examiner* — Omer Khalid
(74) *Attorney, Agent, or Firm* — Patterson + Sheridan, LLP

(57) ABSTRACT

Techniques are disclosed for recognizing aspect ratio errors in image frames of a video and reporting the same. An aspect ratio checker application receives a video that includes multiple image frames and identifies aspect ratio changes in those image frames using a first differential of a time series that includes determined positions of the top, bottom, left, and right of content regions within the image frames. In particular, the aspect ratio checker may identify aspect ratio changes based on non-zero points of the first differential, and the aspect ratio checker further determines aspect ratios of content regions within image frames corresponding to the non-zero points of the first differential. In addition, the aspect ratio checker may generate and display a report indicating the determined aspect ratios and image frame ranges associated with those aspect ratios.

22 Claims, 6 Drawing Sheets

(56) References Cited

U.S. PATENT DOCUMENTS

2019/0188881 A1\* 6/2019 Ritchey ................ G06T 7/0006
2019/0313085 A1\* 10/2019 Trevor ............... H04N 5/23238

\* cited by examiner

A

B

A

B

ASPECT RATIO ERROR RECOGNITION

BACKGROUND

Field of the Disclosure

Aspects presented in this disclosure generally relate to recognizing aspect ratio errors in image frames of a video.

Description of the Related Art

The aspect ratio of an image is a proportional relationship between a width of the image and a height of the image. Various aspect ratios have been introduced for different exhibition and broadcast media, such as the standard 1.33:1 aspect ratio for television viewing and the 1:78:1 widescreen aspect ratio for viewing in cinemas. Black bars may be added to the image frames of a video, on the top and bottom and/or sides, in order to transfer the video from one aspect ratio to another while preserving the original aspect ratio. For example, letterboxing has been used to transfer widescreen aspect ratio videos to standard-width video formats by adding black bars to the top and bottom of the widescreen aspect ratio videos.

When black bars are added to the image frames of a video, aspect ratio errors may be introduced such that non-black regions of the image frames do not maintain a desired aspect ratio. For example, a row (or column) of pixels in an image frame may become part of the surrounding black bars instead of the desired image, or the non-black regions in the image frames of a video may suddenly switch from one aspect ratio to another. Manual identification of such aspect ratio errors is a time consuming process that can cause eye fatigue and attention strain, and humans can also miss aspect ratio errors in videos. Traditional automated tools for checking aspect ratio errors have produced many false positives, by improperly identifying aspect ratio errors.

SUMMARY

One aspect of this disclosure provides a computer-implemented method for recognizing aspect ratio errors in a video including a plurality of image frames. The method generally includes, determining, for each image frame of the plurality of image frames, positions of a top, bottom, left, and right of a content region in the image frame. The method further includes generating at least one time series based, at least in part, on the determined positions. In addition, the method includes determining aspect ratios of content regions in image frames corresponding to non-zero points in at least one first differential of the at least one time series.

Other aspects include, without limitation, a computer-readable medium that includes instructions that enable a processing unit to implement one or more aspects of the disclosed method, as well as a system configured to implement one or more aspects of the disclosed method.

BRIEF DESCRIPTION OF THE DRAWINGS

So that the manner in which the above recited aspects are attained and can be understood in detail, a more particular description of aspects of this disclosure, briefly summarized above, may be had by reference to the appended drawings.

It is to be noted, however, that the appended drawings illustrate only typical aspects of this disclosure and are therefore not to be considered limiting of its scope, for the disclosure may admit to other equally effective configurations.

DETAILED DESCRIPTION

Figure 1:
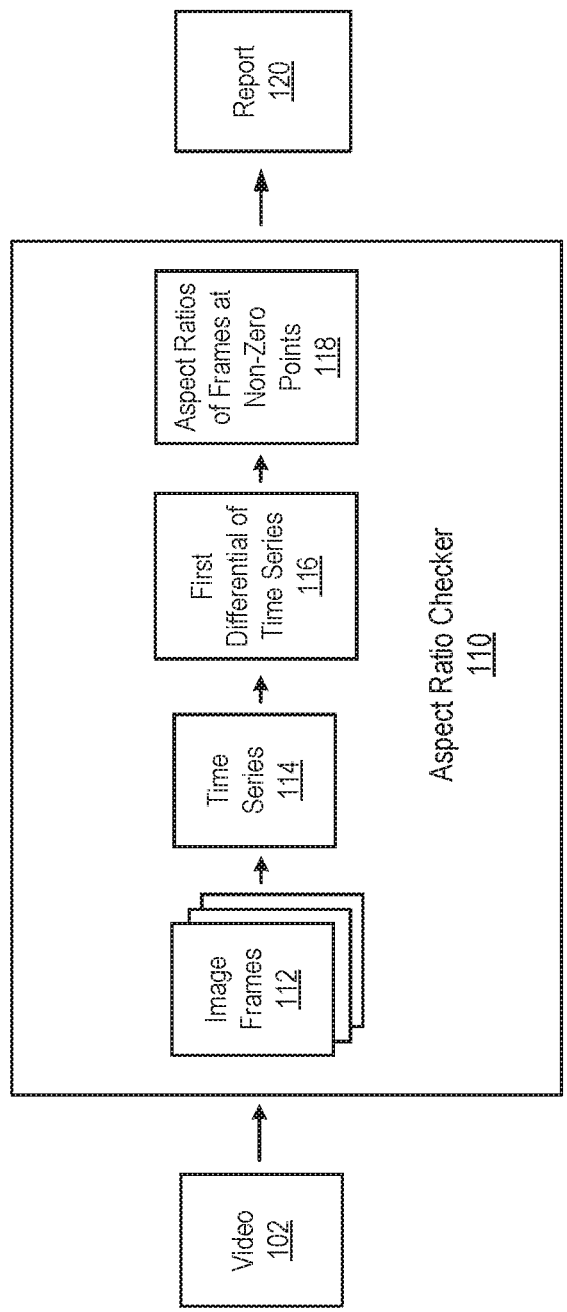
FIG. 1 illustrates an approach for detecting and reporting aspect ratio errors in image frames of a video, according to an aspect of this disclosure.

Aspects of this disclosure provide an approach for recognizing aspect ratio errors in image frames of a video and reporting the same. In one configuration, an aspect ratio checker application receives a video that includes multiple image frames and identifies aspect ratio changes in those image frames based on a first differential of a time series that includes positions of the top, bottom, left, and right of content regions within the image frames. As used herein, a "content region" refers to an image frame region that remains after black bars have been removed from the image frame, i.e., the image frame exclusive of any black bars therein. The aspect ratio checker is configured to compute a first differential of the aforementioned time series, identify aspect ratio changes based on points where the first differential is non-zero, and determine the aspect ratio of content regions within image frames corresponding to the non-zero points of the first differential. The aspect ratio checker may further generate and display a report indicating the determined aspect ratios and image frames ranges associated with those aspect ratios.

In the following, reference is made to aspects of the present disclosure. However, it should be understood that this disclosure is not limited to specific described aspects. Instead, any combination of the following features and elements, whether related to different aspects or not, is contemplated to implement and practice the aspects disclosed herein. Furthermore, although aspects may achieve advantages over other possible solutions and/or over the prior art, whether or not a particular advantage is achieved by a given aspect is not limiting of this disclosure. Thus, the following aspects, features, configurations and advantages are merely illustrative and are not considered elements or limitations of the appended claims except where explicitly recited in a claim(s). Likewise, reference to "the aspect" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware configuration, an entirely software configuration (including firmware, resident software, micro-code, etc.) or a configuration combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., an aspect ratio checker application) or related data available in the cloud. For example, the aspect ratio checker could execute on a computing system in the cloud, determine aspect ratio errors in the image frames of a video according to techniques disclosed herein, and store the results of the determination at a storage location in the cloud. Doing so allows a user to access this information from any computing system attached to a network connected to the cloud (e.g., the Internet).

Referring now to FIG. 1, an approach is illustrated for detecting and reporting aspect ratio errors in image frames of a video, according to an aspect of this disclosure. As shown, an aspect ratio checker application 110 receives as input a video 102 that includes multiple image frames. In one configuration, the aspect ratio checker 110 may (1) splice the received video 102 into its component image frames 112, (2) determine whether any of the image frames 112 are all black, (3) determine, for each of the image frames 112 that is not all black, positions of the top, bottom, left, and right of a content area within the image frame, (4) generate a time series 114 from the determined positions, (5) determine a first differential 116 of the time series 114, (6) determine aspect ratios of content regions in image frames that correspond to points where the first differential 116 is non-zero, and (7) output a report indicating, e.g., the determined aspect ratios and image frame ranges associated with those aspect ratios.

Subsequent to splicing the video 102 into the image frames 112, the aspect ratio checker 110 determines whether any of the image frames 112 are completely black. The aspect ratio checker 110 disregards completely black image frames when checking for aspect ratio errors, as it is unnecessary and indeed impossible to check the aspect ratio of a (non-existent) content region within a black image frame. In one configuration, each image frame may be represented as a matrix of pixels in which each pixel is represented by three values on the RGB (red, green, blue) spectrum. When determining whether an image frame is all black, differences between pixel color values and a value of the color black may be tolerated up to a threshold of tolerance. Doing so may reduce the number of false positives that would otherwise be produced if a more exact numerical match were required. For example, in a color model where a color's value can range from 0 to 255, with 0 being true black, the threshold may be set to between 10 and 12.

Figure 2:
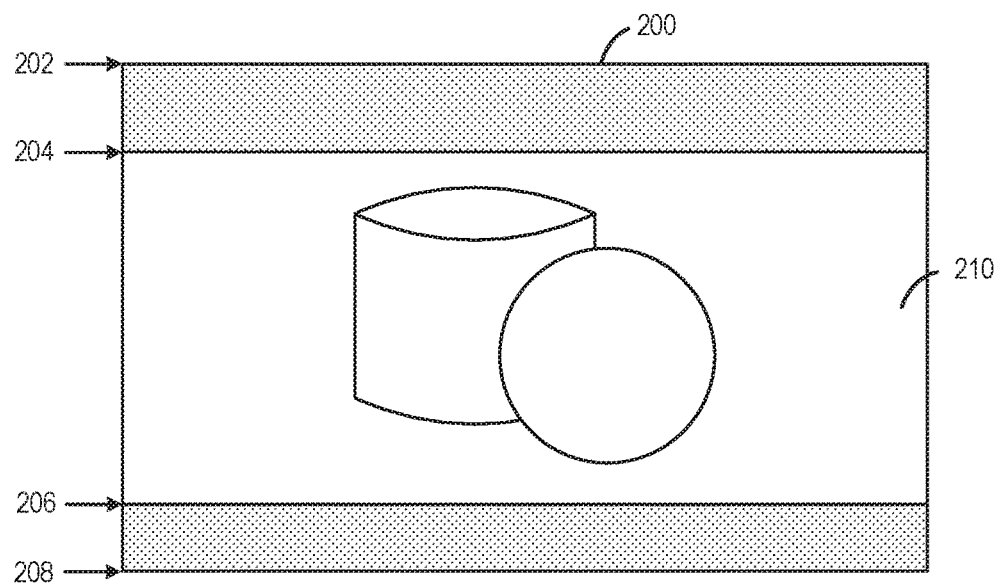
FIG. 2 illustrates an example of determining positions of the top, bottom, left, and right of a content area within an image frame, according to an aspect of this disclosure.
Figure 2:
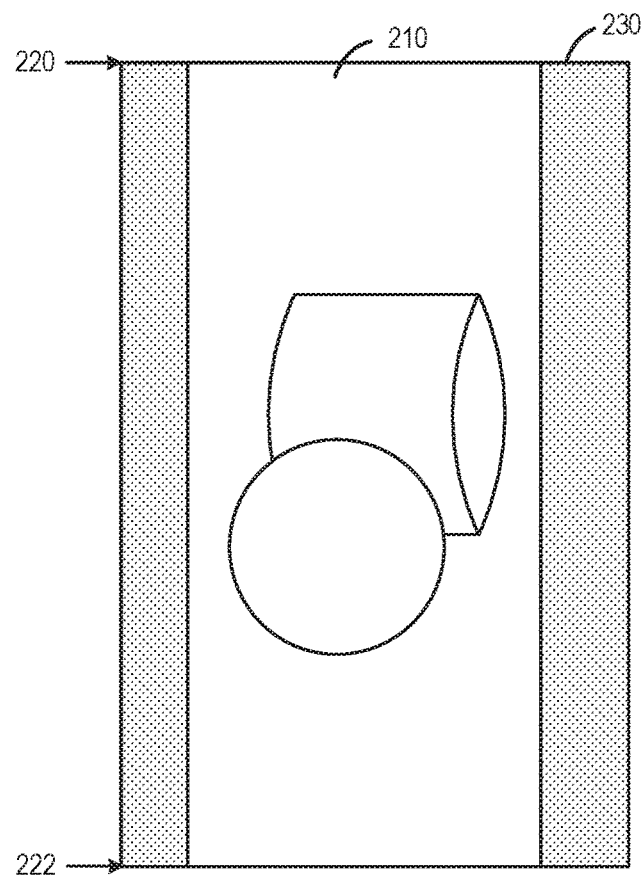

Subsequent to identifying and skipping completely black image frames, the aspect ratio checker 110 determines, for each remaining image frame (that is not all black), positions of the top, bottom, left, and right of a content area within the image frame. In one configuration, the determined positions may be represented as (and/or converted into) distances from the top, bottom, left, and right edges of the image frame, as opposed to (x,y) coordinates in the image frames. FIG. 2 illustrates an example of determining positions of the top, bottom, left, and right of a content area 210 within an image frame 200, according to an aspect of this disclosure. As shown in panel A, the aspect ratio checker 110 determines a position of the top of the content region 210 by starting from a top row of pixels 202 of the image frame 200 and proceeding downward, checking every row to determine whether the row includes all black pixels, and breaking when a row 204 of pixels that is not all black is reached, indicating the top of the content region 210. To check for rows of black pixels, the aspect ratio checker 110 may compare the image frame 200 on a row-by-row and (within each row a) pixel-by-pixel basis to a value of the color black and identify rows having pixel values that are all within a threshold of tolerance of the black color value, such between 10 and 12 where the color of black is 0. The aspect ratio checker 110 may likewise determine a position of the bottom of the content region 210 by starting from a bottom row 208 of the image frame 200 and proceeding upward until a row 206 that is not all black is reached, indicating the bottom of the content region 210.

The foregoing process may be repeated to determine positions of the left and right sides of the content region 210 after the aspect ratio checker 110 rotates the image frame 200 by 90 degrees, as shown in panel B. Illustratively, the aspect ratio checker 110 determines a left side of the content region 210 by starting from a top row 220 of the rotated image frame 230 (after the image frame 200 is rotated by 90 degrees) and proceeding downward to check for rows that are not all black. In this example, the top row 220 of the rotated image frame 230 is not all black, so the aspect ratio checker 110 immediately breaks and stores a position of the top row as the left of the content region 210. However, in frames that contain vertical letterboxing, the aspect ratio checker 110 may not identify the left of the content region 210 immediately starting from the top of the rotated image frame 230. The aspect ratio checker 110 may similarly determine a position of the right side of the content region 210 by starting from a bottom row 222 of the rotated image frame 230 and proceeding upward until a row that is not all black is reached (in this case, the bottom row 222 is not all black), indicating the right side of the content region 210.

In one configuration, the aspect ratio checker 110 may determine coordinates of the top of the content region 210 that the aspect ratio checker 110 then normalizes to a distance from the top edge of the image frame, and similarly for the bottom, left, and right of the content region 210. That is, the determined positions of the top, bottom, left, and right of the content region 210 may initially be in the form of coordinates, such as (x,y) coordinates with respect to the entire image frame, and the aspect ratio checker 110 may normalize such coordinates so that the positions of the top, bottom, left, and right of the content region 210 are expressed in terms of distances from corresponding edges of the image frame. The following code may be used to perform such normalization in a particular configuration of the aspect ratio checker 110: top_distance=top; bottom_distance=frame_height−bottom; left_distance=left; right_distance=frame-width−right.

Although a 90 degree rotation is used in the example of FIG. 2, it should be understood that alternative configurations of the aspect ratio checker 110 may determine positions of the top, bottom, left, and right of content regions in other ways, such as by proceeding from the left and right of image frames to determine the left and right positions of content regions, rather than rotating by 90 degrees and proceeding from the top and bottom of the image frames. Further, although the example image frame 200 in FIG. 2 includes black bars on the top and bottom, but not the sides of the image frame 200, techniques described herein for determining positions of the top, bottom, left, and right of content regions within the image frames of a video are also applicable to image frames with black bars on only on the sides, or on both the top and bottom and the sides.

Returning to FIG. 1, after determining positions of the top, bottom, left, and right of the content region in each image frame, the aspect ratio checker 110 generates a time series 114 based on the determined positions and determines a first differential 116 of the time series 114. For example, the time series 114 may be an array indicating image frame numbers, as well as the determined positions of the top, bottom, left, and right of content regions within those image frames. Although discussed herein primarily with respect to a single time series that includes the top, bottom, left, and right positions of content regions, which may be expressed as distances from the (top, bottom, left, and right) edges of each image frame, in an alternative configuration, the top, bottom, left, and right edge distances may be separated into distinct time series. In such a case, each of the distinct time series may be processed (by taking a first differential, etc.) in a similar manner as the time series with combined top, bottom, left, and right edge distances. That is, either one time series may be created that includes the top, bottom, left, and right position information and a first differential taken of such a time series, after which the top, bottom, left, and right components separated out thereafter, or the distinct time series may be created for each of the top, bottom, left, and right positions in the beginning.

Figure 3:
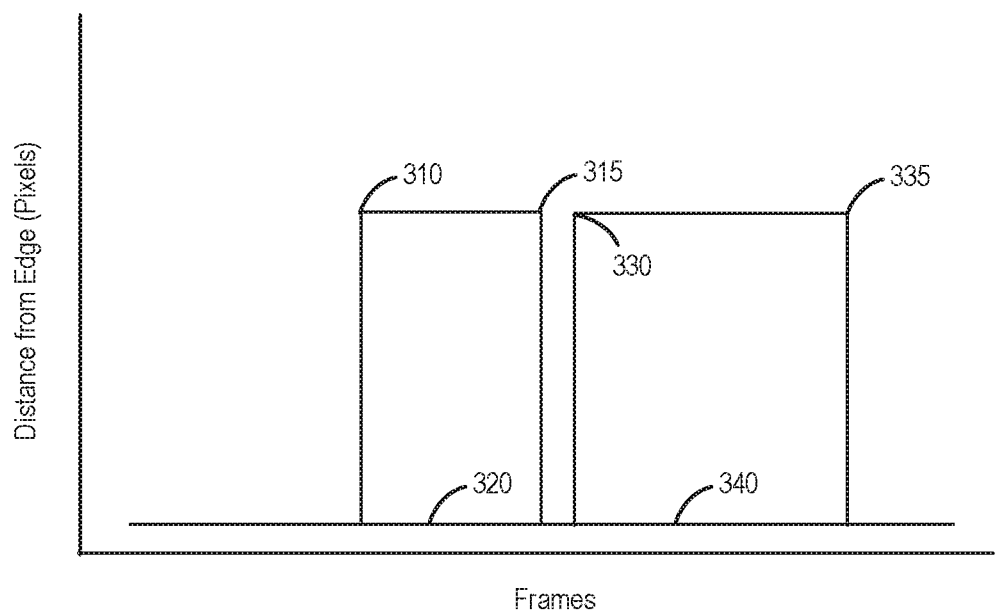
FIG. 3 illustrates an example plot of a time series that includes positions of the top, bottom, left, and right of content regions within the image frames of a video, as well as a first differential of the time series, according to an aspect of this disclosure.
Figure 3:
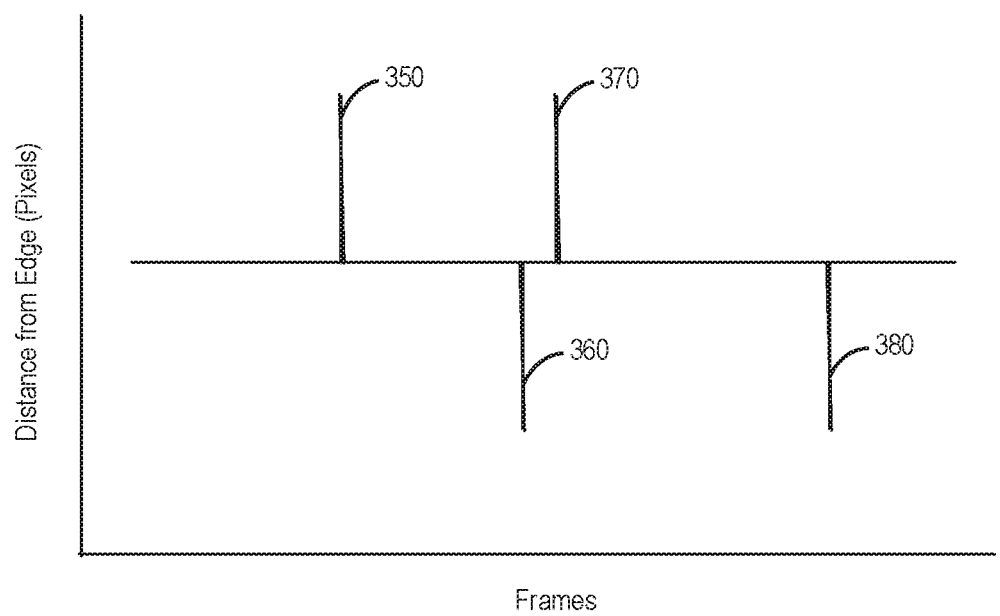

FIG. 3 illustrates an example plot of a time series that includes positions of the top, bottom, left, and right of content regions within the image frames of a video, expressed as edge distances, as well as a first differential of the time series. As shown in panel A, the time series indicates that the distance from a corresponding edge (in pixels) of one of the top, bottom, left, and right of the content regions increases at time 310 and decreases back to the original edge distance at a later time 315. Other edge distances do not change from time 310 to time 315, as shown by the (overlapping) edge distances 320 that remain constant. For example, the top (or bottom, left, or right) of content regions within the image frames may suddenly move downward (or upward, to the right, or to the left where the bottom, left, or right of the content regions change positions), increasing the edge distance at time 310, and vice versa at time 320. Similarly, the edge distance of one of the top, bottom, left, and right of the content regions within the image frames increases again at time 330 and decreases back to the original edge distance at time 335, while other edge distances 340 remain unchanged.

Panel B shows the first differential of the edge distances shown in panel A. As shown, the first differential of edge distances is zero everywhere except at points 350, 360, 370, and 380, which correspond to the times 310, 315, 330, and 335, respectively, where the edge distances of one of the top, bottom, left, and right of the content regions changes. The first differential may generally be, e.g., an array including zeroes and occasional non-zero numbers. By calculating the first differential of edge distances and identifying non-zero points therein, the aspect ratio checker 110 may determine, based on the non-zero points of the first differential, where the aspect ratio of content regions is changing. Examples of such aspect ratio changes include the increase of the edge distance at time 310 corresponding to the positive first differential value 350, the decrease of the edge distance at time 315 corresponding to the negative first differential value 360, the increase of the edge distance at time 330 corresponding to the positive first differential value 370, and the decrease of the edge distance at time 335 corresponding to the negative first differential value 380. The aspect ratio checker 110 is configured to investigate such changes in aspect ratio identified based on the non-zero first differential values.

Returning to FIG. 1, after determining the first differential 116 of the time series 114 and identifying where any of the (top, bottom, left, and/or right) components of the first differential 116 is non-zero (also referred to herein as points where the first differential of the time series is non-zero), the aspect ratio checker 110 further determines the aspect ratio of the content regions within the image frames that correspond to the non-zero points in the first differential 116. It should be understood that each of the non-zero points in the first differential 116 occurs where the edge distance(s) of the content region in one image frame differs from the corresponding edge distance(s) of the content region in an immediately subsequent image frame. Such an immediately subsequent image frame is referred to herein as the "corresponding image frame," and the aspect ratio checker 110 determines the (changed) aspect ratio of a content region in the corresponding image frame. It should be understood that, calculating only the aspect ratios of content regions in images frames that correspond to non-zero points in the first differential 116 of the time series 114 is faster than calculating an aspect ratio of the content region in each image frame and comparing such an aspect ratio to an expected aspect ratio. In addition, the aspect ratio checker 110 is able to detect subtle shifts of only a few pixels based on non-zero first differential values, including shifts that occur on individual edge distance axes (e.g., where only the top or only the bottom of the content region shifts). Experience has shown that such subtle shifts may be missed with other techniques, such as comparing to determine whether the aspect ratio of a content region within each image frame is within a threshold of tolerance of an aspect ratio. For example, if the aspect ratio shifted to another aspect ratio and back again, but not quite the same as the original aspect ratio, then a comparison to determine whether the aspect ratio is within a threshold of tolerance of an aspect ratio may miss such a shift, whereas techniques disclosed herein based on non-zero points in the first differential of the time series would not.

As further shown, the aspect ratio checker 110 outputs a report 120, which may indicate the determined aspect ratios and image frame ranges associated with those aspect ratios. In general, any suitable report 120 may be generated by the aspect ratio checker 110. For example, the report 120 may include a user interface (UI), displayed via a display device, that lists time stamps of image frame ranges where particular aspect ratios occur, as determined based on the non-zero first differential points and aspect ratios determined for corresponding image frames. Each such image frame range may begin with an image frame for which an aspect ratios was determined, as a result of a corresponding non-zero first differential value, and end with a next image frame for which another aspect ratio was determined, as a result of another non-zero first differential value. The generated UI allows a user to see aspect ratio changes in the video 102, which may be indicative of aspect ratio errors. Of course, other UIs, such as a UI that displays image frames whose aspect ratios differ from an expected aspect ratio, may be output for display in alternative configurations.

Figure 4:
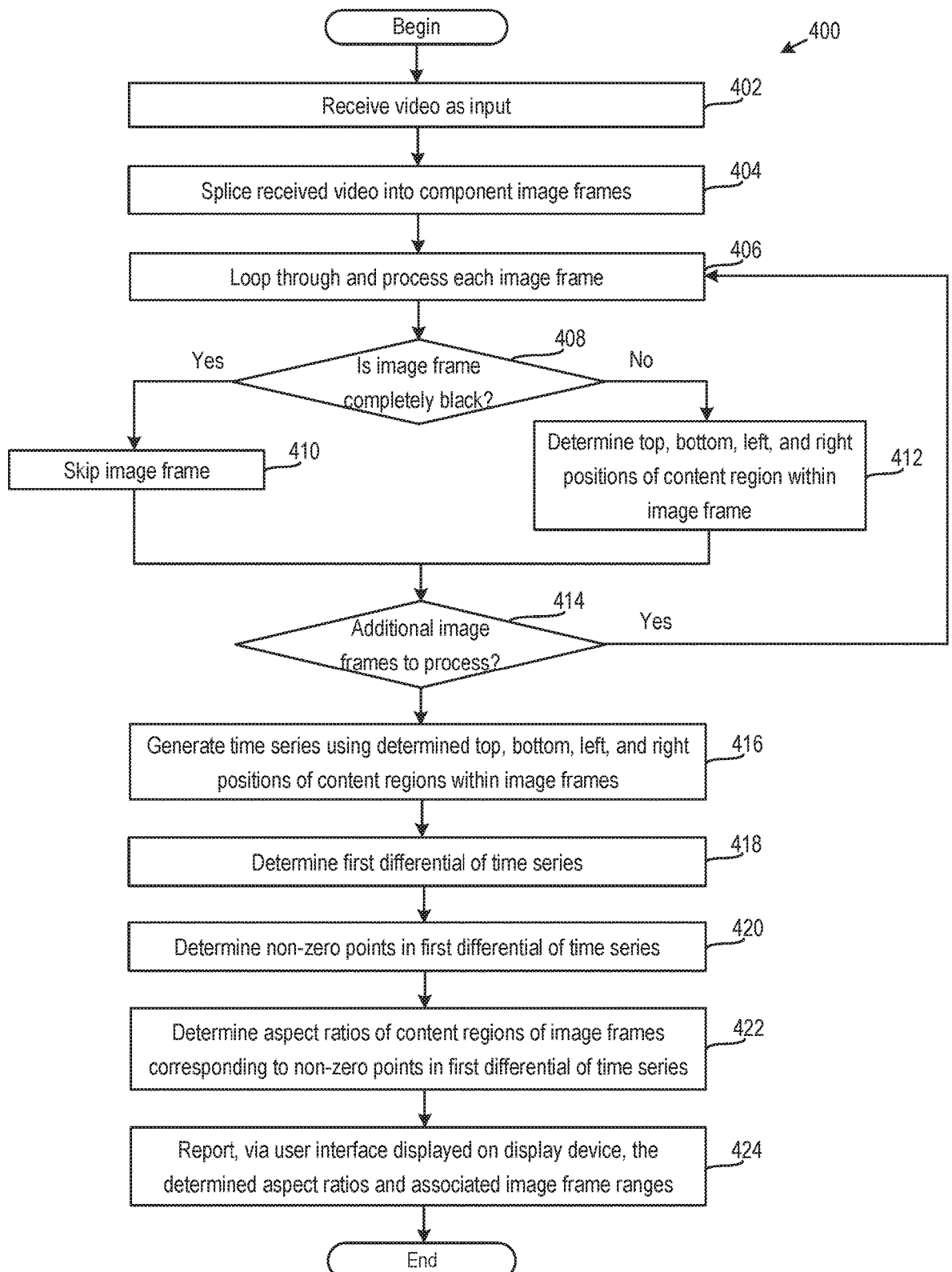
FIG. 4 illustrates a method for detecting and reporting aspect ratio errors in a video, according to an aspect of this disclosure.

FIG. 4 illustrates a method 400 for detecting and reporting aspect ratio errors in a video, according to an aspect of this disclosure. As shown, the method 400 begins at operation 402, where the aspect ratio checker 110 receives a video as input.

At operation 404, the aspect ratio checker 110 splices the received video into component image frames. Any suitable splicing technique may be used to extract still image frames from the video, including splicing functions provided by publicly available video processing libraries such as the FFmpeg library.

At operation 406, the aspect ratio checker 110 loops through and processes each of the image frames in turn. Although shown for illustrative purposes as a loop through each of the image frames, some configurations may utilize parallel processing instead. For example, the aspect ratio checker 110 may break a video into chunks of image frames and process each of the chunks in parallel.

During the processing of the image frames, the aspect ratio checker 110 determines whether one of the image frames is completely black at operation 408. In one configuration, the aspect ratio checker 110 may compare (on, e.g., a row-by-row and pixel-by-pixel basis) color values of each pixel in the image frame to a value of the color black. In such a case, the aspect ratio checker 110 may determine that the image frame is completely black if the color values of pixels in the image frame all match the black color value up to a threshold of tolerance. As described, for a color model where color values can range from 0 to 255, with 0 being true black, the threshold may be set to between, e.g., 10 and 12.

If the image frame is completely black, then at operation 410, the aspect ratio checker 110 skips the image frame, and the method 400 continues to operation 414, where the aspect ratio checker 110 determines whether there are additional image frames to process. As described, completely black image frames do not include content regions whose aspect ratios should be checked for errors.

Figure 5:
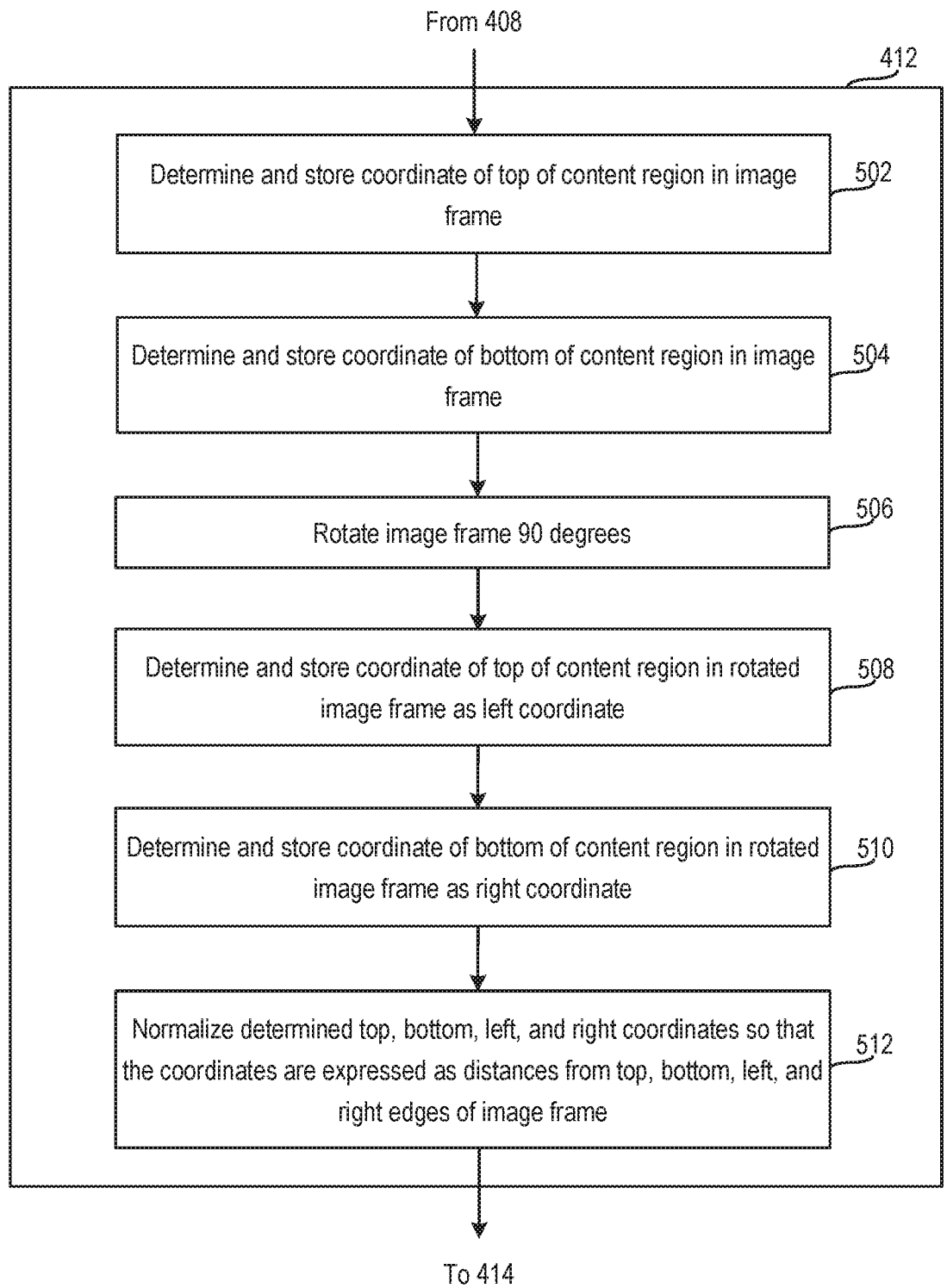
FIG. 5 illustrates in greater detail one of the operations in the method of FIG. 4, according to an aspect of this disclosure.

On the other hand, if the image frame is not all black, then at operation 412, the aspect ratio checker 110 determines top, bottom, left, and right positions of a content region within the image frame. In one configuration, the top, bottom, left, and right positions may be determined as distances from top, bottom, left, and right edges, respectively, of the image frame. In such a case, the aspect ratio checker 110 may normalize (x, y) coordinates determined for the top, bottom, left, and right of the content region to be distances from the top, bottom, left, and right edges of the image frame, respectively, as discussed in greater detail below. However, the top, bottom, left, and right positions may also be stored differently in alternative configurations, e.g., as (x, y) coordinates within the image frame. FIG. 5 illustrates the determining of the top, bottom, left, and right positions of the content region in greater detail, according to an aspect of this disclosure. As shown, at operation 502, the aspect ratio checker 110 determines and stores a top coordinate of the content region within the image frame, where a top black bar ends and the content region begins. In one configuration, the aspect ratio checker 110 starts from the top of the image frame and checks, on a row-by-row and pixel-by-pixel basis, whether values of pixels in a row all match the value for black up to the threshold of tolerance. Once again, the threshold may be set to between, e.g., 10 and 12 for a color model in which color values can range from 0 to 255 and 0 is true black. If all of the pixels in a row are within the threshold of black, then the aspect ratio checker 110 may consider such a row to be completely black and move on to the next row. On the other hand, if any non-black pixels are detected in a row, then the processing breaks and the aspect ratio checker 110 stores the coordinate (i.e., row count) of that row as the top coordinate.

At operation 504, the aspect ratio checker 110 determines and stores a coordinate of a bottom of the content region within the image frame. Operation 504 is similar to operation 502, except the aspect ratio checker 110 starts from the bottom of the image frame and checks, on a row-by-row and pixel-by-pixel basis, whether the values of pixels in a row all match a value for black up to the threshold of tolerance. The aspect ratio checker 110 skips such completely black rows and stores a coordinate (i.e., the row count from the bottom) of a first row the aspect ratio checker 110 reaches with at least one non-black pixel as the bottom of the content region.

At operation 506, the aspect ratio checker 110 rotates the image frame by ninety degrees in order to determine positions of the left and right sides of the content region in the image frame. Then, at operations 508-510, the aspect ratio checker 110 essentially repeats the operations 502-504 of determining and storing coordinates of a bottom and a top of the content region within the rotated image frame in order to obtain the left and right coordinates of the content region, respectively. As the image frame has been rotate by ninety degrees, the coordinates of the bottom and top of the content region in the rotated image frame that are determined at operations 508-510 are actually coordinates of the left and right edges of the image frame prior to the rotation. Subsequent to step 510, the aspect ratio checker 110 has coordinates for each of the top, bottom, left, and right edges where black bars end and a content region begins.

At operation 512, the aspect ratio checker 110 normalizes the determined top, bottom, left, and right coordinates so that the positions of the top, bottom, left, and right of the content region are expressed as distances from the top, bottom, left, and right edges of the image frame, rather than, e.g., (x,y) coordinates of the entire image frame. Example code for such a normalization is described above, and the normalization can make interpretation of a time series easier.

Returning to FIG. 4, at operation 414, the aspect ratio checker 110 determines if there are more image frames in the video to process, in which case the method 400 returns to operation 406, where the aspect ratio checker 110 continues looping through and processing the (remaining) image frames. On the other hand, if there are no more image frames in the video to process, then the method 400 continues to operation 416, where the aspect ratio checker 110 generates a time series using the determined top, bottom, left, and right positions of content regions within the image frames. In one configuration, such a time series may indicate, for each image frame number (of image frames that are not completely black), the determined distances from the image frame edges of the top, bottom, left, and right of the content region within the image frame. In another configuration, the top, bottom, left, and right edge distances may also be separated into distinct time series, with each of those time series being processed in a similar manner as a time series with the top, bottom, left, and right edge distances combined.

At operation 418, the aspect ratio checker 110 determines a first differential of the time series generated at step 416. As described, the first differential of the time series represents the rate of change of the top, bottom, left, and right positions of the content regions at each relevant point in time.

Then, at operation 420, the aspect ratio checker 110 determines points where any of the (top, bottom, left, and/or right) components of the first differential of the time series has a non-zero value. The non-zero first differential values are indicative of changes to the aspect ratio of content regions within successive image frames.

At operation 422, the aspect ratio checker 110 determines the aspect ratios of content regions in image frames corresponding to the determined points where the first differential is non-zero. That is, the aspect ratio checker 110 determines a proportional relationship between the width and height (in pixels) of the content regions within image frames corresponding to non-zero values in the first differential of the time series. In a configuration in which the top, bottom, left, and right positions of content regions are expressed as edge distances, the aspect ratio checker 110 may determine the height of a content region within an image frame as the total height of the image frame minus the sum of the distances that the content region is from the top and bottom edges of the image frame, i.e., height=total_height−(top+bottom). In addition, the aspect ratio checker 110 may determine the width of the same content region within the image frame as the total width of the image frame minus the sum of the distances that the content region is from the left and right edges of the image frame, i.e., width=total_width−(left+right).

At operation 424, the aspect ratio checker 110 reports, via a user interface displayed on a display device, the aspect ratios determined at step 422 and image frame ranges where those aspect ratios occur, each of the ranges beginning with an image frame for which an aspect ratios was determined and ending with a next image frame for which another aspect ratio was determined. For example, the aspect ratio checker 110 may generate (and cause to be displayed) a user interface that lists the time stamps of image frames for each of the determined aspect ratios. Other UIs, such as a UI that displays image frames whose aspect ratios differ from an expected aspect ratio, may be generated by the aspect ratio checker 110 in alternative configurations.

Figure 6:
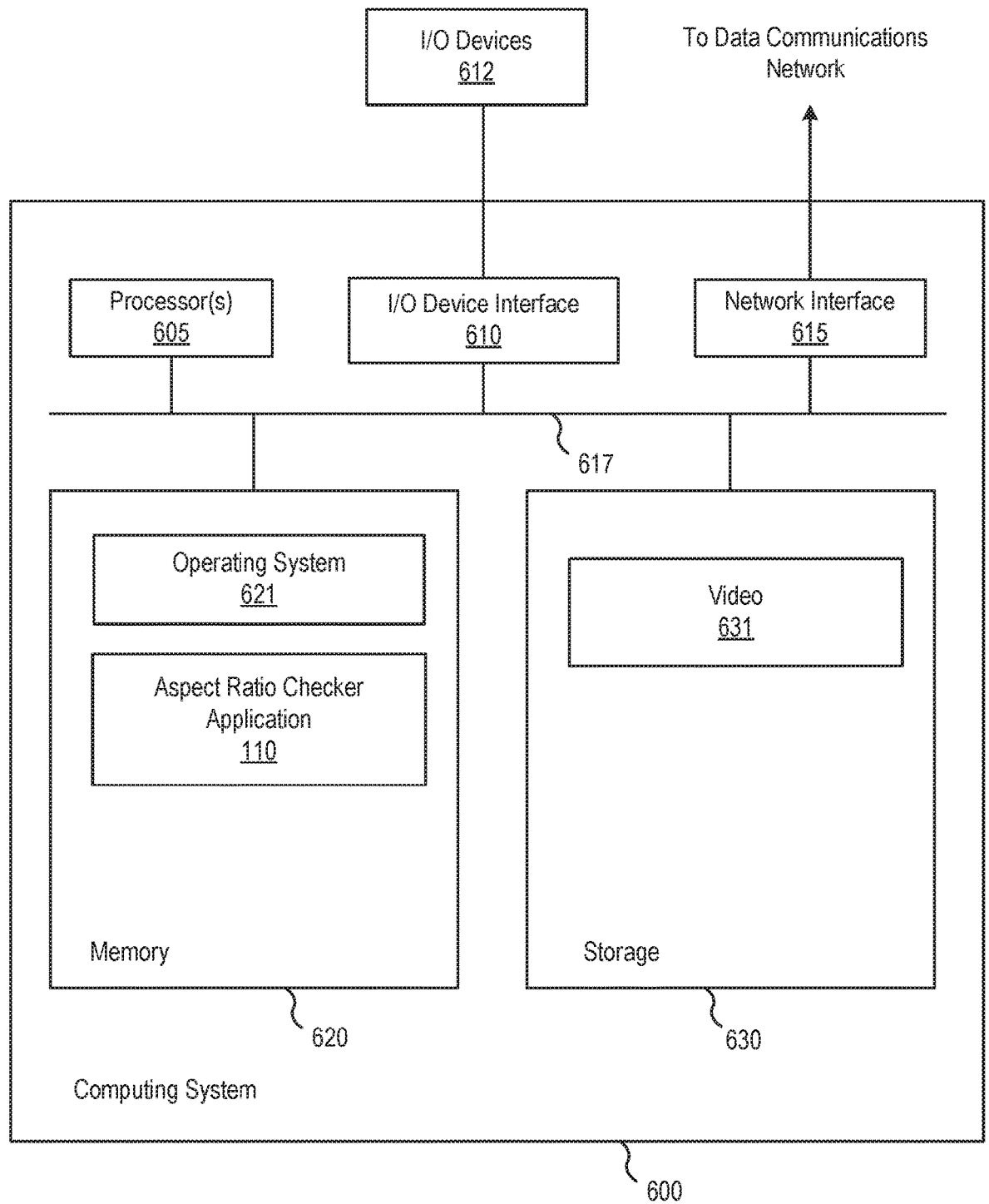
FIG. 6 illustrates a system in which an aspect of this disclosure may be implemented.

FIG. 6 illustrates a system 600 in which an aspect of this disclosure may be implemented. As shown, the system 600 includes, without limitation, a central processing unit (CPU) 605, a network interface 615 connecting the system 600 to a network 616, an interconnect 617, a memory 620, and storage 630. The system 600 also includes an I/O device interface 610 connecting I/O devices 612 (e.g., keyboard, display and mouse devices) to the system 600.

The CPU 605 retrieves and executes programming instructions stored in the memory 620. Similarly, the CPU 605 stores and retrieves application data residing in the memory 620. The interconnect 617 facilitates transmission, such as of programming instructions and application data, between the CPU 605, I/O device interface 610, storage 630, network interface 615, and memory 620. The CPU 605 is included to be representative of a single CPU, multiple CPUs, a single CPU having multiple processing cores, one or more graphics processing units (GPUs), a combination of such processors, and the like. And the memory 620 is generally included to be representative of a random access memory. The storage 630 may be a disk drive storage device. Although shown as a single unit, the storage 630 may be a combination of fixed and/or removable storage devices, such as magnetic disk drives, flash drives, removable memory cards or optical storage, network attached storage (NAS), or a storage area-network (SAN). As shown, the storage 630 includes a video 631 that may be processed using the aspect ratio checker application 110. Further, the system 600 is included to be representative of a physical computing system as well as virtual machine instances hosted on a set of underlying physical computing systems. Further still, although shown as a single computing system, one of ordinary skill in the art will recognized that the components of the system 600 shown in FIG. 6 may be distributed across multiple computing systems connected by a data communications network.

As shown, the memory 620 includes an operating system 621 and the aspect ratio checker application 110. The operating system 621 may be, e.g., Linux® or Windows®. The aspect ratio checker application 110 is configured to recognize aspect ratio errors in the image frames of videos and report the same. In one configuration, the aspect ratio checker application 110 may receive a video as input; splice the received video into component image frames; loop through and processes each of the image frames by skipping completely black image frames and determining top, bottom, left, and right positions of a content region within each image frame that is not completely black; generate a time series using the determined top, bottom, left, and right positions of content regions within the image frames; determine a first differential of the generated time series; determine points where the first differential of the time series is non-zero; determine aspect ratios of content regions of image frames corresponding to the non-zero points; and report, via a user interface displayed on a display device, the determined aspect ratios and image frame ranges where those aspect ratios occur, according to the method 400 discussed above with respect to FIGS. 4-5.

Advantageously, techniques are disclosed for automatically recognizing and reporting aspect ratio errors in image frames of videos. Aspect ratio errors that can be recognized include (1) sudden changes from one aspect ratio to another after black bars are removed from the image frames, and (2) fluctuations in such an aspect ratio between image frames, including fluctuations that are difficult to perceive by the naked eye. Experience has shown that techniques disclosed herein may be faster and detect relatively minor aspect ratio changes that other approaches, such as comparing the aspect ratio of a content region within each image frame of a video to an expected aspect ratio while permitting a threshold of tolerance, may miss.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to aspects of the present disclosure, other and further aspects of this disclosure may be devised without departing from the basic scope thereof, and the scope thereof is determined by the claims that follow.

What is claimed is:

1. A computer-implemented method for recognizing aspect ratio errors in a video including a plurality of image frames, the computer-implemented method comprising:

determining, for each image frame of the plurality of image frames, positions of a top and a bottom of a content region in the image frame by skipping completely black rows at a top and a bottom of the image frame until the top and the bottom, respectively, of the content region are reached, wherein all pixels in a completely black row have color values within a threshold from a color value for black;

determining, for the image frame, positions of a left and a right of the content region in the image frame;

generating at least one time series based, at least in part, on the determined positions;

determining at least one first differential of the at least one time series; and determining that an aspect ratio error exists based on identifying non-zero points in the at least one first differential of the at least one time series, wherein the video is processed to remove the aspect ratio error.

2. The computer-implemented method of claim 1, wherein the positions of the top, the bottom, the left, and the right of the content region in each image frame of the plurality of image frames are determined as distances from a top edge, a bottom edge, a left edge, and a right edge of the image frame, respectively.

3. The computer-implemented method of claim 1, wherein determining, for each image frame of the plurality of image frames, the positions of the left and the right of the content region in the image frame comprises:
   rotating the image frame by ninety degrees; and
   skipping completely black rows at a top and a bottom of the rotated image frame until the left and right, respectively, of the content region are reached.

4. The computer-implemented method of claim 1, further comprising, determining that a first image frame of the plurality of image frames does not include the content region based on a determination that all pixels of the first image frame have color values within the threshold of the color value for black.

5. The computer-implemented method of claim 1, further comprising, reporting the determined aspect ratio errors and associated image frames in the video.

6. The computer-implemented method of claim 1, wherein the at least one time series includes either (1) a time series that includes the positions of the top, the bottom, the left, and the right of the content regions in the plurality of image frames, or (2) distinct time series for the positions of each of the top, the bottom, the left, and the right of the content regions in the plurality of image frames.

7. The computer-implemented method of claim 1, wherein multiple chunks of the plurality of image frames from the video are processed in parallel.

8. The computer-implemented method of claim 1, further comprising, splicing the video into the plurality of image frames.

9. A non-transitory computer-readable medium including instructions that, when executed by a processing unit, cause the processing unit to recognize aspect ratio errors in a video including a plurality of image frames, by performing operations comprising:
   determining, for each image frame of the plurality of image frames, positions of a top and a bottom of a content region in the image frame by skipping completely black rows at a top and a bottom of the image frame until the top and the bottom, respectively, of the content region are reached, wherein all pixels in a completely black row have color values within a threshold from a color value for black;
   determining, for each image frame of the plurality of image frames, positions of a left and a right of the content region in the image frame;
   generating at least one time series based, at least in part, on the determined positions;
   determining at least one first differential of the at least one time series; and
   determining that an aspect ratio error exists based on identifying non-zero points in the at least one first differential of the at least one time series, wherein the video is processed to remove the aspect ratio error.

10. The non-transitory computer-readable medium of claim 9, wherein the positions of the top, the bottom, the left, and the right of the content region in each image frame of the plurality of image frames are determined as distances from a top edge, a bottom edge, a left edge, and a right edge of the image frame, respectively.

11. The non-transitory computer-readable medium of claim 9, wherein determining, for each image frame of the plurality of image frames, the positions of the left and the right of the content region in the image frame comprises:
   rotating the image frame by ninety degrees; and
   skipping completely black rows at a top and a bottom of the rotated image frame until the left and the right, respectively, of the content region are reached.

12. The non-transitory computer-readable medium of claim 9, the operations further comprising, determining that a first image frame of the plurality of image frames does not include the content region based on a determination that all pixels of the first image frame have color values within the threshold of the color value for black.

13. The non-transitory computer-readable medium of claim 9, the operations further comprising, reporting the determined aspect ratio errors and associated image frames in the video.

14. The non-transitory computer-readable medium of claim 9, wherein the at least one time series includes either (1) a time series that includes the positions of the top, the bottom, the left, and the right of the content regions in the plurality of image frames, or (2) distinct time series for the positions of each of the top, the bottom, the left, and the right of the content regions in the plurality of image frames.

15. The non-transitory computer-readable medium of claim 9, wherein multiple chunks of the plurality of image frames from the video are processed in parallel.

16. The non-transitory computer-readable medium of claim 9, the operations further comprising, splicing the video into the plurality of image frames.

17. A system for recognizing aspect ratio errors in a video including a plurality of image frames, the system comprising:
   a computer processor; and
   a memory containing a program that, when executed on the computer processor, performs operations comprising:
      determining, for each image frame of the plurality of image frames, positions of a top and a bottom of a content region in the image frame by skipping completely black rows at a top and a bottom of the image frame until the top and the bottom, respectively, of the content region are reached, wherein all pixels in a completely black row have color values within a threshold from a color value for black;
      determining, for each image frame of the plurality of image frames, positions of a left and a right of the content region in the image frame;
      generating at least one time series based, at least in part, on the determined positions;
      determining at least one first differential of the at least one time series; and
      determining that an aspect ratio error exists based on identifying non-zero points in the at least one first differential of the at least one time series, wherein the video is processed to remove the aspect ratio error.

18. The system of claim 17, the operations further comprising, reporting the determined aspect ratio errors and associated image frames in the video.

19. The system of claim 17, wherein determining, for each image frame of the plurality of image frames, the positions of the left and the right of the content region in the image frame comprises:
   rotating the image frame by ninety degrees; and
   skipping completely black rows at a top and a bottom of the rotated image frame until the left and the right, respectively, of the content region are reached.

20. The system of claim 17, the operations further comprising, determining that a first image frame of the plurality of image frames does not include the content region based on a determination that all pixels of the first image frame have color values within the threshold of the color value for black.

21. The computer-implemented method of claim 1, wherein for each image frame of the plurality of image frames, the positions of the left and the right of the content region in the image frame are determined, without rotating the image frame, by skipping completely black columns at a left and a right of the image frame until the left and the right, respectively, of the content region are reached.

22. The computer-implemented method of claim 1, wherein the at least one first differential of the at least one time series indicates a rate of change of the position of at least one of the top, the bottom, the left, or the right of the content regions from a first image frame of the plurality of image frames and a second image frame of the plurality of image frames.

* * * * *